United States Patent [19]

Burgdore

[11] Patent Number: 4,927,213
[45] Date of Patent: May 22, 1990

[54] SLIP-CONTROLLED HYDRAULIC BRAKE SYSTEM

[75] Inventor: Jochen Burgdore, Offenbach-Rumpenheim, Fed. Rep. of Germany

[73] Assignee: Alfred Teves GmbH, Frankfurt Am Main, Fed. Rep. of Germany

[21] Appl. No.: 322,797

[22] Filed: Mar. 13, 1989

[30] Foreign Application Priority Data

Mar. 17, 1988 [DE] Fed. Rep. of Germany ....... 3808902

[51] Int. Cl.$^5$ .................... B60T 13/70; B60T 13/16; B60T 8/64
[52] U.S. Cl. ................................ 303/116; 303/10; 303/110
[58] Field of Search ............... 303/10, 11, 61, 100, 303/110, 113, 114, 115, 116, 119; 188/181 A; 180/187

[56] References Cited

U.S. PATENT DOCUMENTS

| 3,508,794 | 4/1970 | Engle | 303/10 |
| 4,082,369 | 4/1978 | Black et al. | 303/116 X |
| 4,575,161 | 3/1986 | Vanzant et al. | 303/110 |
| 4,804,236 | 2/1989 | Burgdorf et al. | 303/116 |
| 4,805,965 | 2/1989 | Jonner et al. | 303/113 X |
| 4,826,256 | 5/1989 | Von Hayn et al. | 303/115 X |
| 4,826,258 | 5/1989 | Ocvirk et al. | 303/114 X |

FOREIGN PATENT DOCUMENTS

| 0253157 | 1/1988 | European Pat. Off. | 303/116 |
| 3438401 | 4/1986 | Fed. Rep. of Germany . | |
| 3624722 | 1/1988 | Fed. Rep. of Germany . | |
| 3635846 | 4/1988 | Fed. Rep. of Germany . | |

Primary Examiner—Andres Kashnikow
Assistant Examiner—Timothy Newholm
Attorney, Agent, or Firm—Robert P. Seitter

[57] ABSTRACT

A brake system is provided so that the direction of delivery of a pump is reversible. This is advantageous in that, without any additional valves, the brake system can be used both for controlling a brake slip and for controlling a traction slip. The reversion of the direction of delivery of the pump can be achieved by changing the direction of rotation of the drive.

4 Claims, 1 Drawing Sheet

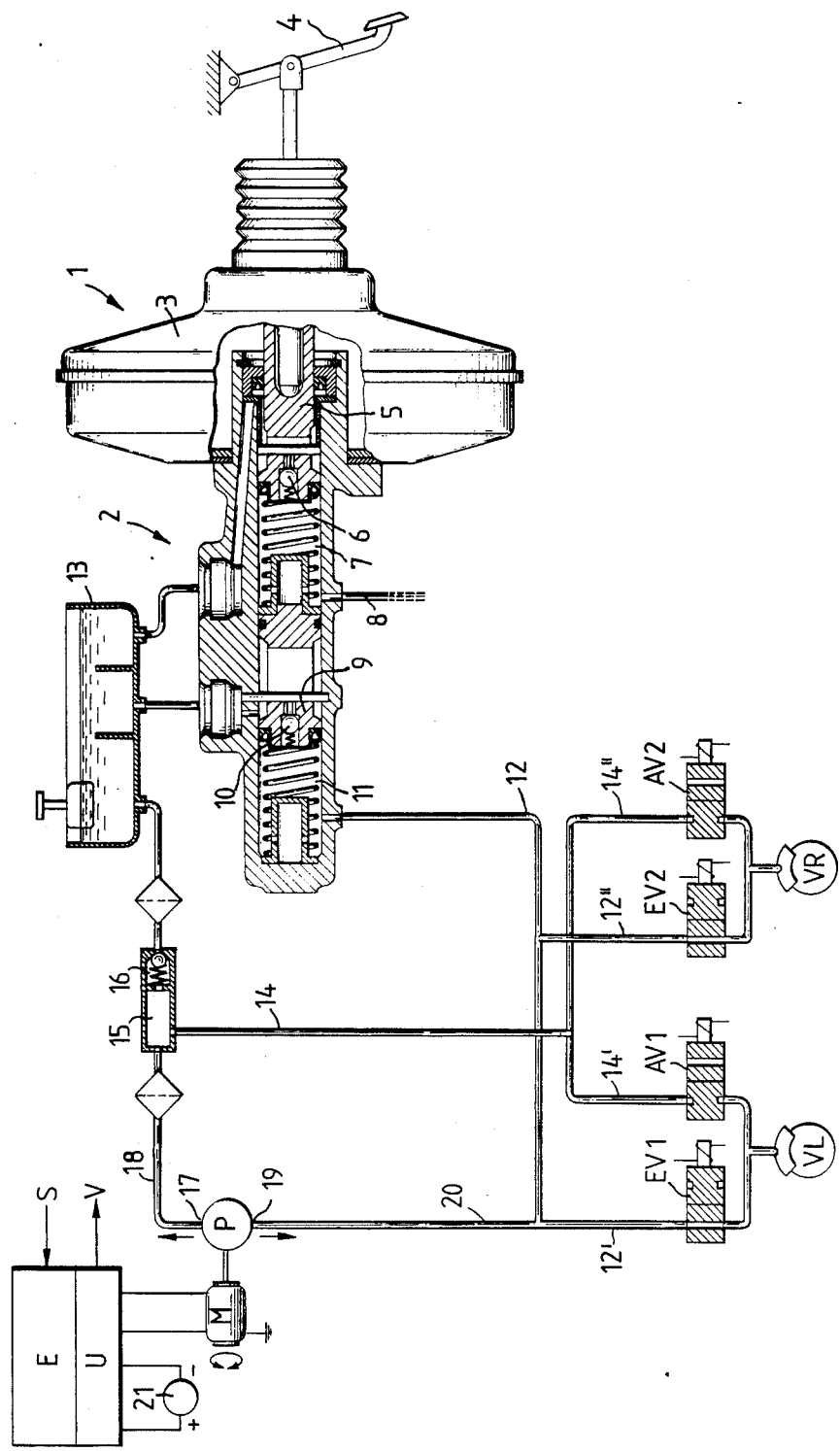

SLIP-CONTROLLED HYDRAULIC BRAKE SYSTEM

BACKGROUND OF THE INVENTION

This invention relates to a slip-controlled hydraulic brake system with a braking pressure generator, which is pressureless in its basic position and which is connected to a storage reservoir. The system further includes at least one wheel brake cylinder for generating a braking torque at the driven wheels and a brake like for connecting the braking pressure generator with the wheel brake cylinder. A first check valve is connected into the brake line and a relief line is connected to the wheel brake cylinders. A second check valve is connected into the relief line. A pressure medium pump also is included having a first connection and a second connection, with the pressure medium being delivered from one connection to the other and with the first connection being connected to the relief line and with the second connection being connected to the braking pressure generator.

A brake system of this general type is described in U.S. Pat. No. 4,743,075 wherein wheel braking pressure control is achieved by letting pressure medium off from the wheel brakes of a wheel threatened by a lock-up and passing it to a storage reservoir so as to redeliver it into the wheel brakes by means of a pump for reaccelerating the wheel. Connected into each of the pressure medium paths to the storage reservoir and to the pump is a check valve for opening or closing the respective line depending upon the demands of the control device for adjusting an optimum brake slip. The check valve provided in the line leading to the pump can be considered an inlet valve and the check valve provided in the line leading to the storage reservoir can be considered an outlet valve. Further, a control valve is connected into the line leading to the pump. For adjusting the pressure at the outlet of the pump to a value proportional to the foot pressure.

For controlling traction slip pressure, medium is supplied to the wheel brake cylinders of the driven wheels in order to generate a braking torque contrary to the driving torque. In this way, the driving wheels will be prevented from spinning during starting or when driving on slippery ground. In order to prevent overcompensation of the driving torque it is possible to let pressure medium off from the wheel brakes. During traction slip control, pressure medium is supplied to the wheel brakes out of the pump, the braking pressure generator being avoided in this action. To this end, further valve means are provided that will prevent the pressure medium from returning out of the pump into the braking pressure generator which will be connected to the storage reservoir when it is not actuated.

Alternatively, it has been suggested to supply the pressure medium out of the pump to the wheel brakes via the relief line and not to supply it by bypassing the braking pressure generator. Thereby, the check valve in the relief line performs the function of an inlet valve while the check valve in the line leading to the pump, or rather to the braking pressure generator, adopts the function of an outlet valve. In this manner, the design of the brake system becomes simpler. Nonetheless, this system still requires valve means connecting the relief line alternatively to the storage reservoir or to the pump outlet. It is, therefore, an object of this invention to further simplify the brake system and, if possible, to completely dispense with any additional valve means.

SUMMARY OF THE INVENTION

This object is accomplished by providing a system wherein the direction of delivery of the pump is reversible so that pressure medium is delivered from a first connection to a second connection during brake slip control and from the second connection to the first connection during traction slip control.

In this regard, the brake system described in, U.S. Pat. No. 4,803,840 should be noted. In contrast to the brake system of U.S. Pat. No. 4,743,075 the system described in U.S. Pat. No. 4,803,840 does not have a pump-charged accumulator. The pump is only switched on if slip control becomes necessary and delivers into the master brake cylinder, with the central valves which establish the communication between the working chambers of the master brake cylinder and the storage reservoir working as control valves to adjust pressure in the brake lines which will be proportional to the foot pressure. This pressure medium path has to be interrupted in case of traction slip control and is effected by means of two check valves inserted into the brake lines.

The pressure invention enables elimination of these check valves since the pump no longer delivers into the brake line but rather into the relief line due to the reversal of its direction of delivery in the case of traction slip control. This may be achieved by the reversal of the polarity of the motor's electric power supply which can be realized by means of simple electrical devices.

This feature of the present invention can be realized for both closed and open systems. In this context, closed systems are those in which the pump will only take back the pressure medium amount let off from the wheel brakes and will deliver it back into the master brake cylinder in case of brake slip control. In an open system there will be an additional communication between the relief line and a storage reservoir via a non-return valve. Thus, in case of brake slip control, the pump will not only deliver the pressure medium let off from the wheel brakes but will also deliver the additional medium from the storage reservoir. In this manner, it is possible to position the master brake cylinder and, during brake slip control, to bring it into a defined position.

BRIEF DESCRIPTION OF THE DRAWING

Further features, advantages and applications of the invention can be seen from the following description of a preferred embodiment of the invention taken in conjunction with the accompanying drawing, the single FIGURE of which is a simplified and partly schematic illustration of the major hydraulic components.

DETAILED DESCRIPTION OF A PREFERRED EMBODIMENT

The brake system consists of a braking pressure generator 1 which is composed of a master brake cylinder 2 and of a vacuum booster 3. In order to actuate the system, a force is applied to a brake pedal 4. This force, boosted by the auxiliary force of the vacuum booster 3, is transmitted to a push-rod piston 5 of the master brake cylinder 2. Under the action of the force, the push-rod piston 5 is displaced, thereby closing central valve 6. In the working chamber 7, a pressure is built up which is transmitted to a floating piston 9. Under the action of this pressure, the floating piston 9 is displaced, thereby closing central valve 10 and pressure is built up in the working chamber 11. Connected to the working chambers 7 and 11 are brake lines 8 and 12. As illustrated, brake line 12 is coupled to the driven front wheels VL, VR of a vehicle. To this end, the brake line 12 bifurcates into two branch lines 12', 12'', one individual wheel of the front axle at a time being connected to each branch line. Check valve EV1 is inserted into branch line 12' and check valve EV2 is inserted into branch line 12''. The check valves are open when currentless. The wheel brakes further communicate with a prechamber 15 via a relief line 14 having branch lines 14' and 14'' associated with individual wheels. Inserted into these branch lines 14', 14'' are outlet valves AV1 and AV2, respectively, said outlet valves being closed when currentless. Prechamber 15 communicates with a storage reservoir 13 via a non-return valve 16 biased to prevent the pressure medium from returning to the storage reservoir 13. Depending on the design of the brake system, it is possible to do without the branch line directed towards the storage reservoir.

The pump P is driven by a motor M and has a first connection 17 and a second connection 19. The first connection 17 communicates with prechamber 15 via a line 18. The second connection 19 communicates with the brake line 12 via a line 20.

The direction of rotation of the motor M is reversible. To this end, a change-over switch U is provided connecting the supply points of the motor M to the poles of a voltage source dependent upon the desired direction of rotation of the motor M. The change-over switch U is part of an electronic unit E receiving slip signals S from the wheels and also sending switch signals V to the valves EV1, AV1, EV2, AV2.

The FIGURE shows the brake in a non-operated condition. The working chamber 7 and 11 communicate with the storage reservoir 13 via open central valves 10 and 6. When the pedal 4 is operated, pressure is built up in the working chambers as already described above. This pressure is passed on, inter alia, via the brake line 12 to the driven wheels Vl, VR of the front axle. The pressure in the brake lines and, hence, in the wheel brakes will be determined by the pressure of the pedal.

During a braking operation, the rotational behavior of the brake's wheels will be monitored permanently so that it will be possible to note at once when any one of the wheels threatens to lock. In such case, corresponding switch signals will be fed to the check valves EV1, AV1, EV2, AV2 as well as to the change-over switch U. The first control step consists in closing the inlet valve EV1 or EV2 of the wheel threatened with a lock-up condition so that no further pressure build-up will be possible in the connected wheel brake. In order to reduce the pressure, the outlet valve AV1 or AV2 will be opened, thereby pressure medium is let off from the wheel brake and passed into the prechamber 15. At the same time, the pump drive M is switched on and in a direction of rotation which will enable the pump's delivery to flow from connection 17 to connection 19. The pump will remove the pressure medium from the prechamber 15 or from the pressure medium storage reservoir 13 (if there is a connection to the same) and will deliver the pressure medium into the brake line 12.

As soon as the wheel threatened by a lock-up sufficiently reaccelerates, the outlet valve AV1 or AV2 will close and the inlet valve EV1 or EV2 will open so that pressure medium can re-enter the wheel brakes and pressure will be built up. Control is achieved by adjusting the wheels in a certain slip range through repeated build-up and reduction of the pressure, thereby transmitting maximum braking forces while simultaneously maintaining the vehicle's steerability.

In addition to the above described brake slip control operation, traction slip control is performed in accordance with the following pattern: When starting or when driving on a slippery surface, the driving torque quite often exceeds the forces which the wheels are able to transmit to the road surface. As a result, the wheels spin, not being able to transmit lateral forces which are a precondition of good steerability of a vehicle. Thus, it has been found that the excessive driving torque should be compensated by a corresponding braking torque.

Such a situation being noted, the electronic unit E will emit signals V to the inlet and outlet valves EV1, AV1 and EV2, AV2, respectively, of the driven wheels. Thereby, the valve EV1 and EV2 will be switched into its locking position and the valve AV1 or AV2 will be switched into its open position. At the same time, the pump drive will be switched on. This will be effected so that there will be a delivery of pressure medium from the second connection 19 to the first connection 17. The second connection 19 communicates with the storage reservoir 13 via the line 20, the brake line 12, the working chamber 11 and the open central valve 10. The delivered pressure medium will enter the relief line 14, via the connection 17, the line 18 and the prechamber 15.

If a communication is provided between the pressure chamber 15 and the storage reservoir 13, the non-return valve 16 is biased to prevent pressure medium from returning into the storage reservoir 13. Thus, it will be possible to supply pressure medium to the wheel brake via the valve AV1 or AV2 and the valve AV1 or AV2 which performed as an outlet valve during a brake slip control operation now will act as an inlet valve. Furthermore, since the wheel is braked beyond proportion, it will be possible to let off pressure medium via the check valve EV1 or EV2 and this valve which worked as an inlet valve during a brake slip control operation now will act as an outlet valve. This reversion of the functions of the modulating valves, thus, is accomplished in a simple way by a reversion of the direction of the pump's delivery. Accordingly, it will be possible to do eliminate additional valves.

What is claimed is:

1. A slip-controlled hydraulic brake system for vehicles having motor driven wheels including:
   a braking pressure generator, which is pressureless in a first position and which is connected to a storage reservoir;
   at least one wheel brake cylinder generating a braking torque at each of the driven wheels;
   a brake line connecting the braking pressure generator with the wheel brake cylinder, and a first check valve connected into said brake line;
   a relief line connected to wheel brake cylinders, and a second check valve connected into said relief line; and,
   a pressure medium pump having a first and a second connection, and means for delivering a pressure medium from one of said connections to the other, said first connection being connected to the relief line and said second connection being connected to the braking pressure generator, the direction of delivery of the pump being reversible so that during a brake slip control operation the pump delivers pressure medium from the first connection to the second connection and, during a traction slip control operation, the pump delivers pressure medium from the second connection to the first connection and including means for supplying fluid from said pump to the wheel brakes during said traction slip control operation, wherein the relief line and the first connection of the pump terminate in a prechamber connected to the storage reservoir by way of a non-return valve with the non-return valve being biased to prevent said pressure medium from returning into the storage reservoir, and wherein in said traction slip control operation, said pump supplies fluid to the wheel brakes by way of said prechamber and by way of actuated outlet valves.

2. The brake system as claimed in claim 1 wherein the pump is driven by a motor, a polarity of supply points of the motor being commutable by means of a change-over switch.

3. The brake system as claimed in claim 2 wherein said motor is switched on only if there is a brake slip control operation or a traction slip control operation.

4. The brake system as claimed in claim 1 wherein when said braking pressure generator is in a first position, said first check valve maintains the brake line open and said second check valve locks the relief line.

* * * * *

UNITED STATES PATENT AND TRADEMARK OFFICE
CERTIFICATE OF CORRECTION

PATENT NO. : 4,927,213

DATED : May 22, 1990

INVENTOR(S) : Burgdorf

It is certified that error appears in the above-identified patent and that said Letters Patent is hereby corrected as shown below:

On the title page, under item [19], and in item [75]:

"Burgdore" should be -- Burgdorf --.

Signed and Sealed this

Third Day of September, 1991

*Attest:*

HARRY F. MANBECK, JR.

*Attesting Officer*      *Commissioner of Patents and Trademarks*